United States Patent [19]

Williams et al.

[11] Patent Number: 5,092,911
[45] Date of Patent: Mar. 3, 1992

[54] METHOD AND APPARATUS FOR SEPARATION OF OIL FROM REFRIGERANTS

[75] Inventors: J. Andy Williams, Fremont; Clyde Witham, Montara, both of Calif.

[73] Assignee: SRI International, Menlo Park, Calif.

[21] Appl. No.: 585,486

[22] Filed: Sep. 20, 1990

[51] Int. Cl.$^5$ .................. B01D 53/04; B01D 53/24; B01D 53/28
[52] U.S. Cl. ............................. 55/1; 55/31; 55/33; 55/74; 55/75; 55/316; 55/319; 55/337; 55/338; 55/387; 55/389; 62/471
[58] Field of Search ............ 55/1, 30, 31, 33, 35, 55/74, 316, 319, 337, 338, 387, 75, 389; 62/471, 503, 512; 210/693, 925

[56] References Cited

U.S. PATENT DOCUMENTS

| | | | |
|---|---|---|---|
| 2,096,851 | 10/1937 | Fricke | 55/316 X |
| 2,504,184 | 4/1950 | Dawson | 55/316 |
| 2,511,967 | 6/1950 | Campbell | 55/337 X |
| 2,548,335 | 4/1951 | Balogh | 55/316 |
| 2,556,292 | 6/1951 | Newcum | 55/316 |
| 3,420,071 | 1/1969 | Bottum | 62/503 |
| 3,464,186 | 9/1969 | Hankison et al. | 55/316 X |
| 3,837,173 | 9/1974 | Kuttruff et al. | 62/503 X |
| 3,841,490 | 10/1974 | Hoffman et al. | 55/316 X |
| 4,097,248 | 6/1978 | Frantz | 55/33 |
| 4,187,695 | 2/1980 | Schumacher | 62/503 |
| 4,496,378 | 1/1985 | Kish | 55/316 |
| 4,516,994 | 5/1985 | Kocher | 55/337 |
| 4,581,903 | 4/1986 | Kerry | 62/503 |
| 4,730,465 | 3/1988 | Inoue | 62/503 |
| 4,835,986 | 6/1989 | Carlisle, Jr. | 62/503 |
| 4,866,951 | 9/1989 | Masterson, II | 62/503 |
| 4,906,264 | 3/1990 | Szymaszek et al. | 55/337 X |
| 4,941,978 | 7/1990 | Gabrick | 210/693 |

FOREIGN PATENT DOCUMENTS

| | | | |
|---|---|---|---|
| 561615 | 8/1958 | Canada | 62/503 |
| 1208789 | 10/1970 | United Kingdom | 62/303 |

OTHER PUBLICATIONS

H. Odani, M. Uchikura, K. Taira, and M. Kurata, Transport and Solution of Gases and Vapors in Styrene-Butadiene Block Copolymers: Absorption and Desorption of n-Hexane Vapor, J. Macromol. Sci--Phys., B17 (2) 337-354 (1980).

Kraton G Rubbers in clear sealants, Technical Bulletin Shell Chemical Company, SC:972-87 (Jul. 1987).

Kraton Thermoplastic Rubber, Shell Chemical, 41-page brochure, (Oct. 1989).

Kraton Thermoplastic Rubber, Shell Chemical Company, 24-page undated brochure.

*Primary Examiner*—Robert Spitzer

[57] ABSTRACT

A method and apparatus for removing oil and water contaminants from chloro-fluoro carbon refrigerants. This system is a single pass filtration system specifically designed for sealed systems with no atmospheric bleed off of chloro-fluoro carbons. This system incorporates a novel oil absorbent and is compact enough for small commercial applications, such as service stations or portable service of environmental control units. This system also incorporates a new cartridge type filter containing both water and oil and particulate absorbtion and removal means.

20 Claims, 3 Drawing Sheets

METHOD AND APPARATUS FOR SEPARATION OF OIL FROM REFRIGERANTS

FIELD OF INVENTION

The present invention relates generally to a novel method and apparatus for separating oil contaminants from refrigerants in a closed system.

BACKGROUND OF THE INVENTION

Liquified gas refrigerant (for example chloro-fluoro-carbon ("CFC")) cooling systems are quite common place in today's world. Nearly every home and many automotives have a CFC cycle refrigerator/freezer, and many homes, office buildings and automotives have CFC cycle environmental cooling systems. During the normal operation of these systems, some of the oil necessary for the lubrication of the refrigerant compressor is mixed into the refrigerant and contaminates it. Water can also contaminate the refrigerant over time. If the refrigerant is to be reused or recycled, it must be cleaned of oil and water.

The present state of the art uses a mechanical oil separator to remove the oil and an absorbent to remove any water contamination of refrigerants. The oil separator is inefficient and the water absorber requires multiple passes and testing after each pass to determine how well the CFC has been cleaned. Applicant's method can be used with various polymers and desiccants; however, applicants have found that a block copolymer (styrene-ethylene/butylene-styrene) works best for oil removal, an example of which is Shell Chemical Company's Kraton G. Presently Kraton is being used in adhesives, sealants, and coatings. Messrs. Odani, Uchikura and Kurata have done work using kraton as an N-Hexane absorber in "Transport Solution of Gases and Vapors and Styrene-Butadiene Block Copolymers: Absorption and Desorption of N-Hexane Vapor" Macromol. Sci-phys. B17 (2), 337-354 (1980). However, applicants are the first to apply Kraton to sorbing oil from refrigerants.

Further, chloro-fluoro-carbons in the atmosphere have become a major environmental concern. Some of the cleaning methods, prior to applicant's invention, include a risk of release into the atmosphere. Further production of chloro-fluoro-carbons is anticipated to be severely curtailed in the near future. Recycling and cleaning existing supplies of contaminated refrigerant while maintaining integrity with respect to atmospheric release will become essential. The price of new chloro-fluoro-carbons may become increasingly prohibitive as production is curtailed.

Applicant's invention overcomes the deficiencies of the prior art in providing a one pass cleaning system with various stages and filters to assure efficient and accurate cleaning of both oil and water contamination. By maintaining an enclosed system and limiting the number of passes and testing, this invention significantly reduces the risk of a leak to the atmosphere.

SUMMARY OF THE INVENTION

A first object of the disclosed invention is to provide an oil sorbant that does not significantly react with refrigerants in a normal to moderately high temperature range.

A second object of the disclosed invention is to provide a one pass filtration system for removing both oil and water contaminants from refrigerants.

A third object of the disclosed invention is to provide a filtration system for removing both oil and water contaminants from refrigerants and that also has an easily replaceable filter element.

A fourth object of the disclosed invention is the removal of contaminating lubricating oil in such a manner that the quantity of oil removed can be measured so that an appropriate quantity of lubricant can be returned to the refrigeration system.

Briefly, the above and other objects are realized by a method for removing hydrocarbons from contaminated refrigerants including the steps of physically contacting the vaporized, hydrocarbon contaminated refrigerant with a surface of a thermoplastic rubber styrene-ethylene/butylene-styrene block copolymer whereupon said thermoplastic rubber sorbs the hydrocarbon and thereby reduces the concentration of the hydrocarbon in the refrigerant. The invention also contemplates a method for removing lubricating oil and water from CFC's (freon) which includes the step of removing water and oil mist by centrifugal cyclonic action; capturing mist that passes the cyclone by granular bed filtration; sorbing the oil by contacting the contaminated refrigerant with a styrene-ethylene/butylene-styrene block copolymer which doesn't react with CFC's and absorbing water by the use of a molecular sieve and filtering out remaining particulate contamination by a small pore filter. These benefits are based on a compound for sorbing hydrocarbon contaminants from a gas/vapor mixture using a thermoplastic rubber comprising styrene-ethylene/butylene-styrene block copolymer. Kraton G is such a copolymer. The invention includes a cyclone apparatus for separating hydrocarbon and water from a vapor/gas mixture comprising chloro-fluoro-carbon contaminated with hydrocarbons and water, including a cylindrical vessel having a leak tight closure and an input port extending tangentially from the side of said vessel such that said port communicates with the interior volume thereof and gas fed through the port will flow around the inside surface of the outer shell of the vessel in a spiral direction about a central filter with sorbing means for removing water and oil. The invention also contemplates a filter cartridge for filtering hydrocarbons and water from a contaminated refrigerant including chloro-fluoro-carbon, having a pair of cylindrical mesh screens with a polymer co-axially arranged with a hydrocarbon sorbent polymer between them. A molecular sieve positioned within the cylindrical volume defined by the second cylindrical screen. The molecular sieve, including a desiccant for absorbing water from the contaminated refrigerant. The cartridge works in such a fashion that a refrigerant contaminated with hydrocarbons and water contacts the first outer screen and passes through the hydrocarbon absorbent polymer over the surface of small pellets of the polymer, absorbing hydrocarbons from the mixture, after which the contaminated refrigerant passes into the molecular sieve, absorbing water from the solution, and finally passes out of the filter cartridge. And also a system using the cyclone described above with a filter cartridge as described above forming a closed one pass filtration system to filter oil and water contaminants from refrigerants.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DESCRIPTION OF THE PREFERRED EMBODIMENTS

Figure 1:
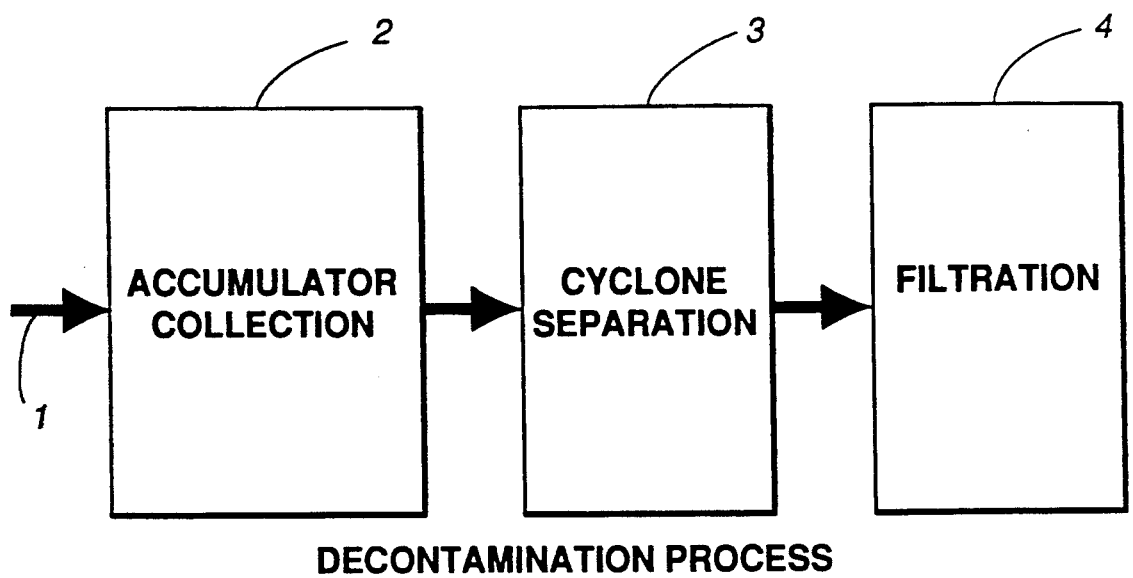
FIG. 1 schematically illustrates by block diagram the overall method of applicant's invention.

Referring now to the drawings, wherein like reference numerals designate identical or corresponding parts throughout the several views, and more particularly to FIG. 1 where the general outline of the system is set forth within a block diagram, where 1 designates the flow of refrigerant into an accumulator 2 where heavier and larger particles of oil and other contaminants, metal filings and the like ar settled out of contaminated refrigerants by gravitation. The accumulator is filled by releasing the pressure of the refrigeration system into the accumulator volume. The lower pressure causes the refrigerant to vaporize. Lubricating oil and water are drawn out of the system with the refrigerant in liquid mist and vapor or gas states. In an alternate embodiment, heat may be applied to further insure that the refrigerant comes out of the mixture and vaporizes. The refrigerant is taken out of this chamber at or near the top to leave whatever contaminants may have settled out in the chamber and enters a cyclone 3 for mist removal. The amount of lubricant taken out of the accumulator at the bottom can be measured so that a like amount of lubricant can be returned to the compressor. There will be a small amount of oil still to be sorbed out to clean the refrigerant but this amount is nearly insignificant for lubricating purposes. The cyclone 3 operates by inertia, primarily, and separates the water and fine oil contaminants from the refrigerant. Afterwards, the refrigerant is run through a filtration system 4 including molecular sieves, absorption of oil by contacting contaminated refrigerant with an oil absorbing polymer and fine mesh filters. After step 4, cleaned refrigerant is produced by the system. This system operates as a single pass method of cleaning water vapor and oil contaminants from refrigerants such as chloro-fluoro-carbons.

Figure 2A:
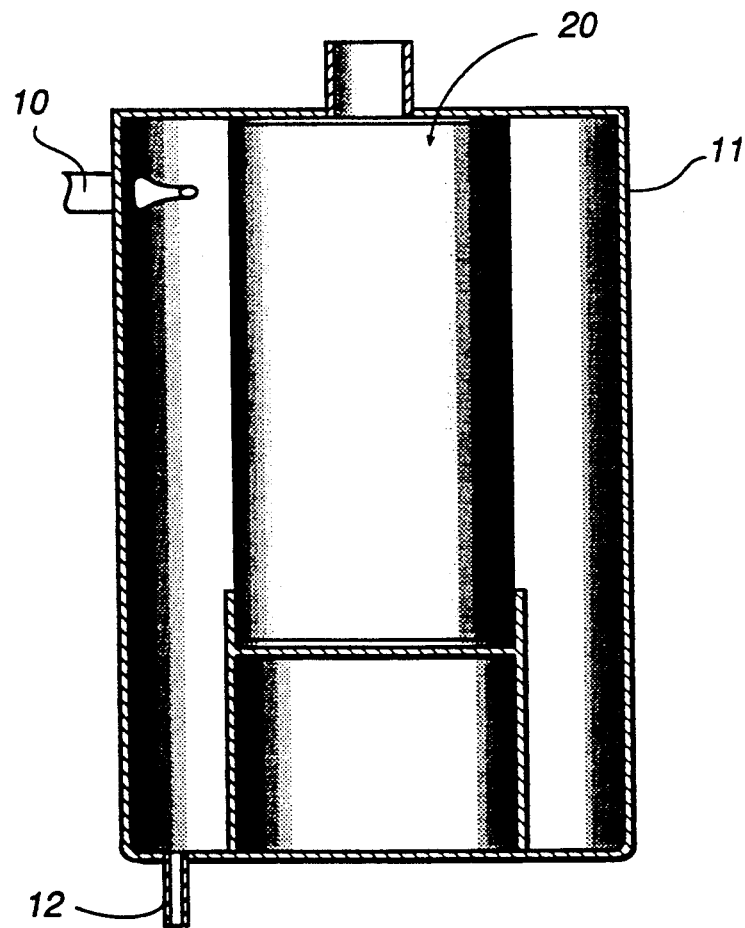
FIG. 2a is an illustration of a cyclone device with a filter cartridge incorporated therein.
Figure 2B:
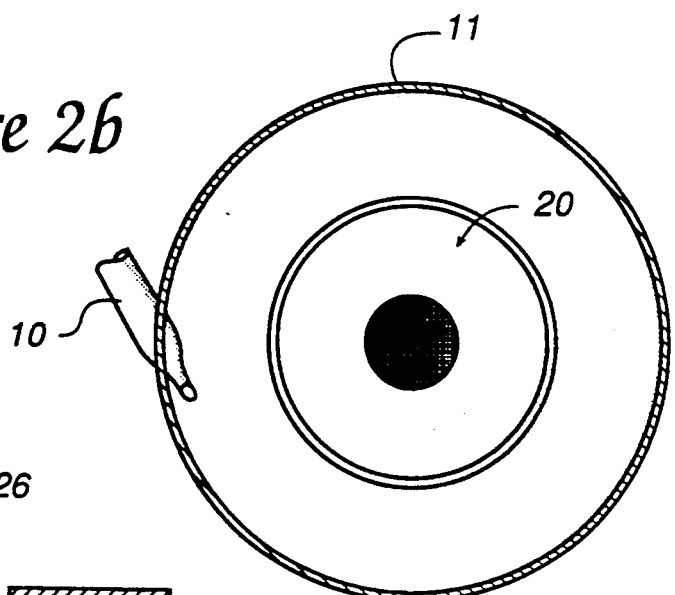
FIG. 2b is a cutaway top view of the cyclone device showing the tangential part.

FIGS. 2a and 2b illustrate a cyclone apparatus with a filtration apparatus centrally incorporated therein. The advantages being the reduction of space necessary to perform both the mechanical and physico-chemical operations. The contaminated refrigerant enters the cyclone from a tangential entry point 10 causing a cyclonic flow in the chamber 11. From the cyclonic flow, liquid (including both oil and water among other contaminants) collects on the outside of the chamber 11 and drains to the bottom thereof. In a preferred embodiment, a drain port 12 is included in the chamber to expel the liquid contaminants which may collect on the inner surface of the chamber walls. At the center of the cyclonic chamber, the filter cartridge 20 exposes the contaminated refrigerant to an oil absorbing polymer, further filters the refrigerant by molecular sieves to remove water and is finally filtered through a small pore polypropylene filter to remove any particulate contamination in the refrigerant as well as retain any polymer or molecular sieve fragments in the filter. In a preferred embodiment, the cyclone housing has a sealable top such that a filter cartridge 20 can be removed and replaced as a unit. Said closures are provided with gaskets to provide gas leak integrity.

Figure 3:
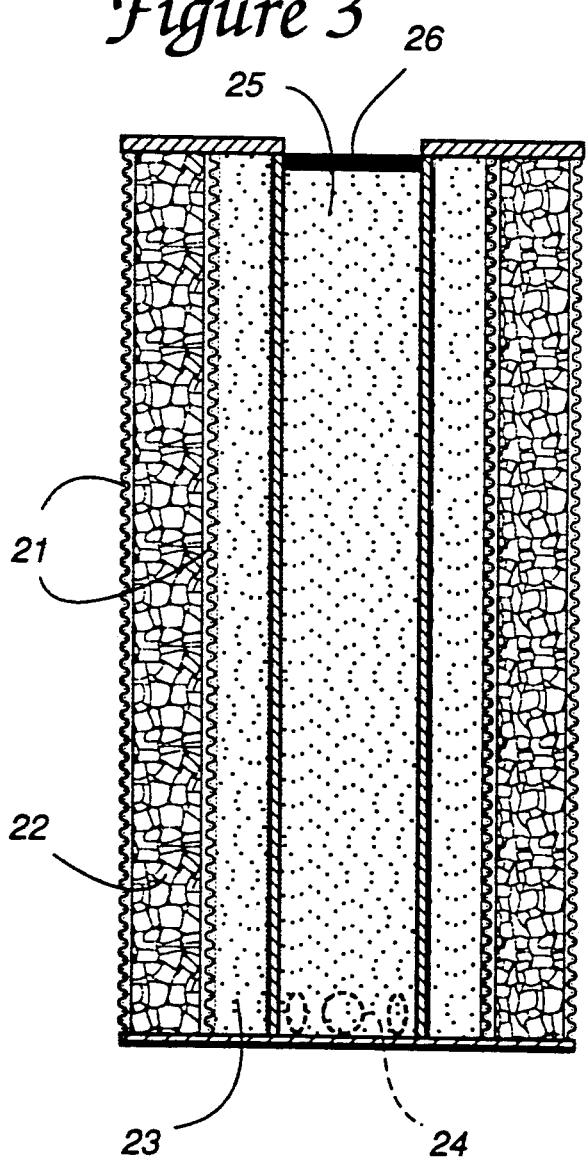
FIG. 3 is a cross sectional view of a filter cartridge.
Figure 4:
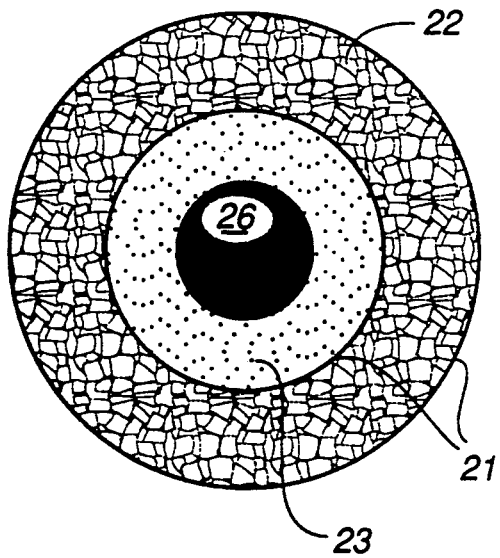
FIG. 4 is a top view of an annular filter cartridge.

The filter cartridge 20, shown in FIG. 2a, is shown in greater detail in FIGS. 3 and 4. The refrigerant from the cyclone enters the filter cartridge at the outer mesh screen 21 and immediately contacts with the oil absorbing material at 22. After which the filtered refrigerant passes through a second mesh screen 21 and a tightly packed molecular sieve material at 23 and makes its way through the holes 24 to the second molecular sieve material 25 and finally through a one to ten micron sized polypropylene filter 26 for filtering polymer and molecular sieve fragments, after which the refrigerant exits the filter cartridge cleaned of both oil and water contaminants. In a preferred embodiment, said mesh screens 21 are of a 30–50 mesh range. In a preferred embodiment, said molecular sieves include $8 \times 12$ $4A \times H$-6 desiccant manufactured by Union Carbide. In a preferred embodiment, the oil absorbent polymer is a high molecular weight block co-polymer. An example of which is Kraton G series, particularly Kraton G 1652. This polymer is further described below.

FIG. 4 shows a top view of the cartridge described above in annular cross section. It is contemplated by the invention that a number of different cross sections may be appropriate for different applications of the filter. It is also contemplated by the invention that the filter may be used independently of a gravitation settling chamber and cyclone as an inline filter for single pass cleaning of refrigerant gases.

In order to solve the problems of cleaning refrigerant gases of hydrocarbon contamination, the invention includes using Kraton G, a polystyrene poly (Ethylene-Butylene) midblock rubber as a novel material for absorbing such hydrocarbon contamination from refrigerants. Specific examples of hydrocarbon contaminants that can be absorbed include machine lubricating oil, motor oil, graphite based lubricants, and gasoline. Kraton, a Shell Oil Company product, has been combined with oil to create a number of products including coatings, sealants, rubbers and even oil additives. However, this invention includes a previously undisclosed property of the material that is its non reactivity with chlorofluoro-carbons which makes it an excellent material for absorbing oil contamination from refrigerants. Experimentation has found that Kraton (though displaying some oil absorbency for oil in its liquid state) is limited by the need for surface area contact. However, oil mists like those present in vaporized contaminated chlorofluoro-carbons are readily absorbed by the Kraton and locked into the molecular structure. Applicants' tests have shown that Kraton can absorb large amounts of oil, as much as ten times its weight. Experiments have also shown that passing oil over the surface area rather than directly through the Kraton is the most effective way to exploit its absorptive qualities due to the fact that as oil is absorbed, the polymer particles form a solid mass. It is anticipated that the polymer would be used in a pellet form, the particle size of ½ to 1 millimeter in diameter and could be solubilized and spray dried to produce smaller particles with more surface area. It is also contemplated to produce a porous material by means of intercalation and exfoliation of a suitable solvent to give higher surface to mass ratio. It is also contemplated that optimum operation would call for replacing the filter upon absorbing 50% of its mass in oil because after that point, the filter polymer begins to solidify, thus causing flow problems for the contaminated refrigerant.

Figure 5B:
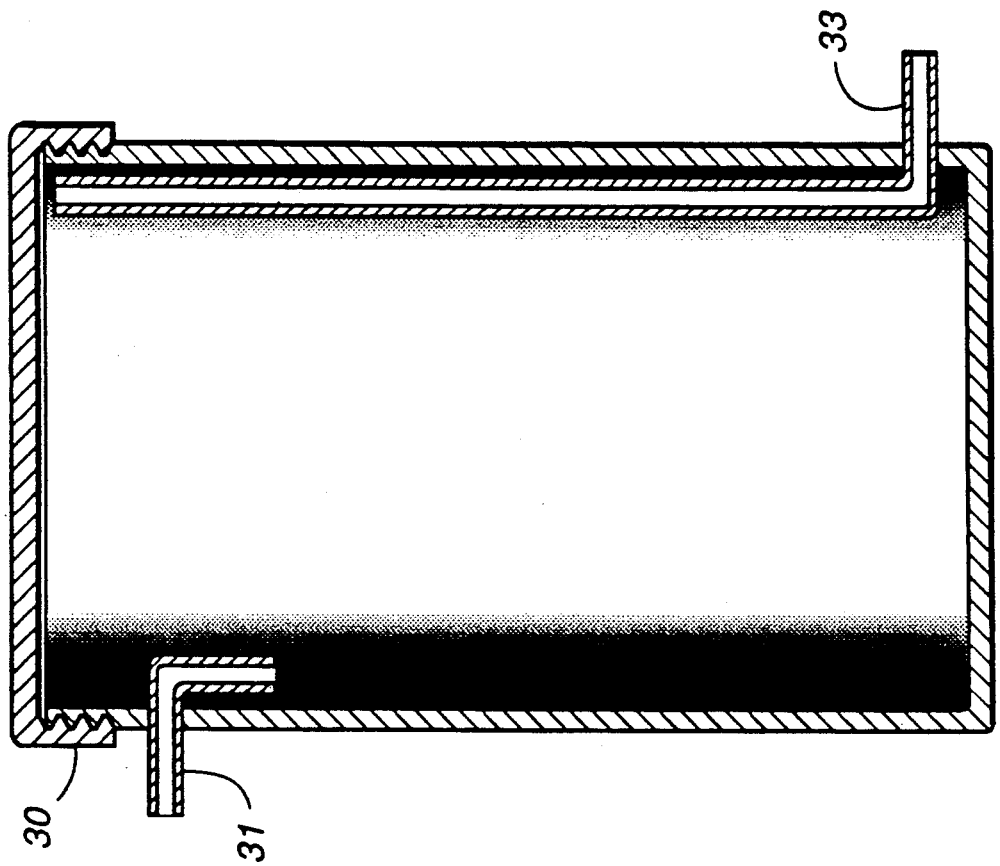
FIG. 5b is a general illustration of a freon/oil accumulator.
Figure 5A:
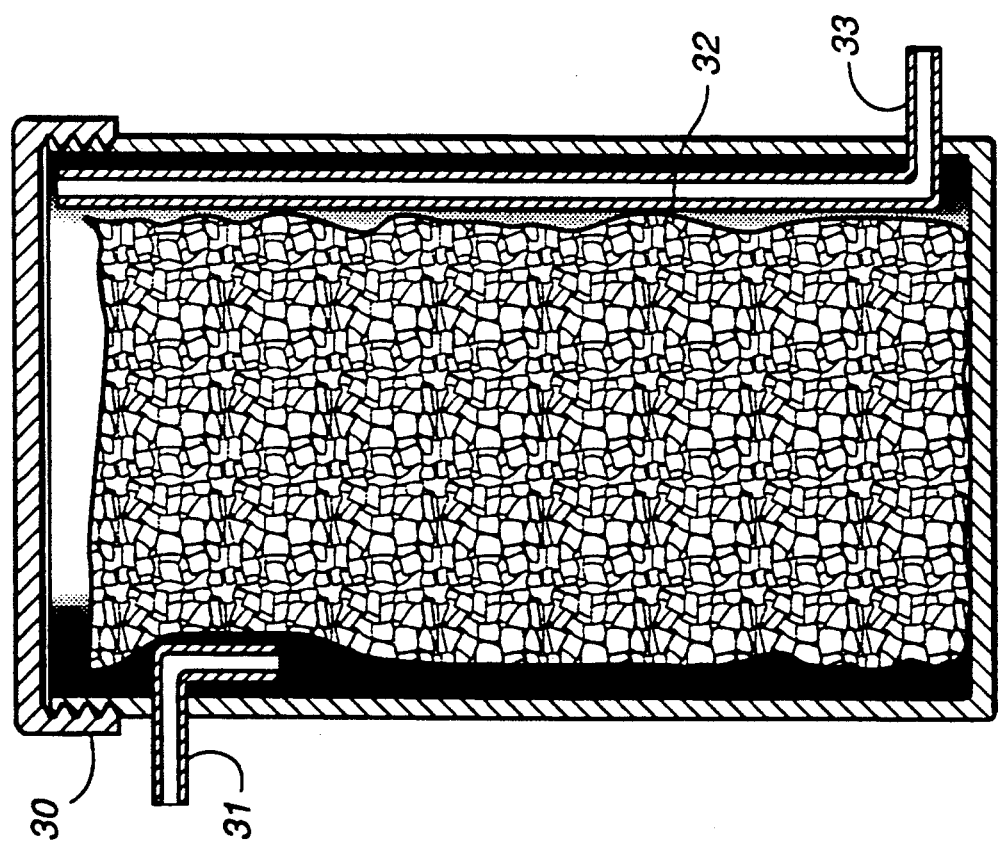
FIG. 5a is a general illustration of a freon/oil accumulator with a bag of sorbant polymer inside.

FIG. 5a of applicant's invention also represents an alternate embodiment of an accumulator. Accumulators are used in refrigerant recovery systems to collect liquid refrigerant before introduction into a compressor. By its very nature, the accumulator will collect oil as well. The problem being that under vacuum, refrigerant rapidly comes out of solution and atomizes the oil. Then the atomized oil can recontaminate the recycled refrigerant. In FIG. 5a, the refrigerant enters the accumulator 30 at inlet 31 and inside comes into contact with the polypropylene mesh bag filled with the sorbent polymer 32 to absorb oil from the contaminated refrigerant. It is also contemplated that an accumulator will be much the same as that in FIG. 5b without the polypropylene mesh bag of the sorbent. Refrigerant exits the chamber through the exit port 33. It is contemplated that the contaminated refrigerant will be subjected to a vacuum causing the refrigerant to come out of solution and atomize the oil as described above, however, with the passing of the refrigerant over the surface area of the oil absorbent, the oil is bound to the sorbant and is not removed with the refrigerant once subjected to the vacuum. An alternate embodiment contemplates employing a waiting period before applying the vacuum. During the waiting period, the oil could be drained from the accumulator into a separate reservoir and sealed from contact with the main body of the accumulator before vacuum is applied. The accumulator described above could also be used as the initial gravitation chamber for preliminary gravitational separation of oil, and chloro-fluoro-carbons as shown in the block diagram in FIG. 1.

Obviously, numerous additional modifications and variations of the present invention are possible in light of the above teachings. It is therefore to be understood that within the scope of the claims, the invention may be practiced otherwise than is specifically described herein.

What is claimed and desired to be secured by letters patent of the United States is:

1. A method for removing hydrocarbons from a vaporous refrigerant mixture comprising the steps of: physically contacting a hydrocarbon contaminated vaporous refrigerant mixture with a surface of a thermoplastic rubber comprising a styrene-ethylene/butylene-styrene block copolymer whereupon said thermoplastic rubber sorbs said hydrocarbon and thereby reduces the concentration of said hydrocarbon in said vaporous mixture.

2. A method described in claim 1 further comprising a step of passing said contaminated refrigerant mixture through a molecular sieve to remove water.

3. A method as described in claim 2 further comprising a step of passing said contaminated refrigerant mixture through a particulate filter to remove particulate contaminants.

4. A method as described in claim 3 wherein said vaporous refrigerant mixture comprises a freon refrigerant, water and a hydrocarbon compressor lubricant.

5. A method as described in claim 4 wherein said hydrocarbon compressor lubricant is selected from the group of: machine lubricating oil, motor oil, graphite based lubricants and gasoline.

6. A method as described in claim 3 further comprising the step of separating water and oil contaminants from said refrigerant by using a cyclonic action for removing said contaminants by inertia.

7. A method as described in claim 6 further comprising the step of settling out dissolved oil and liquid water from said refrigerant by gravity.

8. A method as described in claim 7 further comprising the step of heating said vaporous mixture for increased separation of said oil and liquid water contaminants from said refrigerant.

9. A method for removing oil and water from contaminated vaporized refrigerant comprising the steps of: removing water and oil vapor by centrifugal cyclonic action; sorbing said oil by contacting said solution with a styrene-ethylene/butylene-styrene block copolymer and adsorbing out said water by the use of a molecular sieve.

10. A method as described in claim 9 further including the step of removing copolymer and molecular sieve fragments from said refrigerant by flow through a small pore filter.

11. Apparatus for separating hydrocarbon and water from a vaporous mixture comprising a refrigerant contaminated with hydrocarbon and water comprising:
   a cylindrical cyclone separator vessel having a removable closure at a first end, an input port extending tangentially from the side of said vessel such that said port communicates with the interior volume thereof such that gas fed through said port will flow around an inside surface of said vessel in a spiral direction, and an exit port for gas flow out of said vessel; and
   a cylindrical filter cartridge within said vessel comprising a cylindrical outer mesh screen, a cylindrical inner mesh screen, a polymer filter material between said screens for sorbing hydrocarbon contaminants, a cylindrical tube having openings only at opposite ends thereof disposed inwardly from said inner mesh screen such that the opening at one end of said tube communicates with said exit port, a molecular sieve material disposed between said inner mesh screen and said cylindrical tube and also within said cylindrical tube, and a fine mesh particulate filter disposed within said tube proximate said exit port.

12. An apparatus as described in claim 11 wherein said removable closure has an annular cross section, said exit port is centrally positioned in said closure, and said filter cartridge includes gaskets in one end thereof which abut said closure and fit around said exit port to prevent leakage of unfiltered gas through said vessel.

13. An apparatus as described in claim 12 further comprising a drain port in an end opposite said first end of said vessel for draining any contaminants from said vessel which should accumulate.

14. An apparatus as described in claim 11 wherein said polymer filter material comprises a styrene-ethylene/butylene-styrene block copolymer.

15. An apparatus as described in claim 14 wherein said molecular sieve comprises a desiccant material and said fine mesh filter comprises a polypropolyene filter.

16. An apparatus as described in claim 14 further including a freon/oil accumulator for removing contaminants from a freon refrigerant, said accumulator comprising a container with sufficient interior volume so that liquid freon introduced into said container will vaporize, means for communicating with a refrigerant system to take in contaminated refrigerant into said container, and means defining a gas flow exit from said container for conveying refrigerant from near the top of said container to said tangential input port to said cylindrical cyclone separator vessel.

17. An apparatus as described in claim 16 further comprising means for heating said accumulator to further vaporize refrigerant and increase contaminant recovery.

18. An apparatus as described in claim 17 wherein said accumulator further includes a removable leak tight cover and a poly-propylene mesh bag containing a hydrocarbon sorbing polymer.

19. A filter cartridge apparatus for filtering hydrocarbons and water from a vaporous mixture comprising a refrigerant contaminated with hydrocarbon and water, said apparatus comprising a first cylindrical mesh screen, a second cylindrical mesh screen co-axially positioned inside said first screen a styrene-ethylene/butylene-ethylene block copolymer for removing hydrocarbon contaminants disposed between said screens, a cylindrical tube having openings only at opposite ends thereof co-axially positioned inside said second screen, a molecular sieve comprising a desiccant for removing water from said gaseous solution disposed between said second screen and said tube and also within said tube, and a fine mesh polypropylene particulate filter disposed within said tube at one end thereof.

20. A system for removing hydrocarbons from a vaporous mixture comprising chloro-fluoro-carbon, said system comprising a freon/oil accumulator apparatus comprising a container with a removable leak tight cover having at least two openings communicating to an interior volume of said container such that one of said openings of said freon/oil accumulator communicates to an entry port of a cyclone apparatus wherein gaseous solution treated by said freon/oil accumulator enters tangentially into said cyclone apparatus having a leak tight volume; said gaseous solution proceeds circularly about an interior wall of said leak tight volume having a filter cartridge comprising a hydrocarbon absorbent stage and a water absorbent stage axially centered in said volume for further removing contaminants of said vaporous mixture.

* * * * *